United States Patent [19]

Reese

[11] Patent Number: 4,873,719
[45] Date of Patent: Oct. 10, 1989

[54] ENHANCED CALLING NUMBER DELIVERY SERVICE SYSTEM

[76] Inventor: Morris Reese, 693 Azalea St., Thousand Oaks, Calif. 91360

[21] Appl. No.: 272,829

[22] Filed: Nov. 18, 1988

[51] Int. Cl.⁴ ............................................. H04M 3/58
[52] U.S. Cl. .................................... 379/215; 379/201; 379/142
[58] Field of Search ............... 379/142, 214, 210, 215, 379/207, 201

[56] References Cited

U.S. PATENT DOCUMENTS 4,661,975  4/1987  Brecher .............................. 379/215

FOREIGN PATENT DOCUMENTS 0039154  3/1983  Japan ................................... 379/215
0070648  3/1988  Japan ................................... 379/215

OTHER PUBLICATIONS

Bell Communications, "Calling Number Delivery", Technical Ref. No.TR-TSY-00031, issued Jun. 1988.
S.A. Ciarcia, "Build the Touchtone Interactive Message System", Byte Magazine, Mar. 1985.
Bell Communications, "Dual-Tone Multifrequency Receiver Generic Requirements", Tech. Ref. No. Tr-TSY-0000181, Mar. 1987.

Primary Examiner—James L. Dwyer

[57] ABSTRACT

A process for a telephone system is disclosed which is associated with customer premises equipment, such as a telephone set or other receiving equipment which has a built-in or attached dual-tone multifrequency (DTMF) receiver-decoder chip connected to an alphanumeric memory chip which is connected to a liquid crystal display (LCD) counter, connected via a RJ11 jack and telephone lines to central office equipment, which allows an incoming caller directory telephone number or any keyed-in telephone number or name initiated by the incoming caller to be transmitted over a called customer busy line (i.e. without call-waiting service), idle line (i.e. with or without call-waiting service) or an in-use line (i.e. with call-waiting service) and received to the called customer premises equipment, which is screened and stored to the equipment's memory for later recall and or redialing. Interoffice and intraoffice application of the disclosed system can be deployed by signaling methods capable of transmitting calling line identification or by dual-tone multifrequency end-to-end signaling. The disclosed system is also designed to interact with existing customer subscribed to telephone services and features, and is a revenue producing service intended for residential and cellular telephone customers.

2 Claims, 3 Drawing Sheets

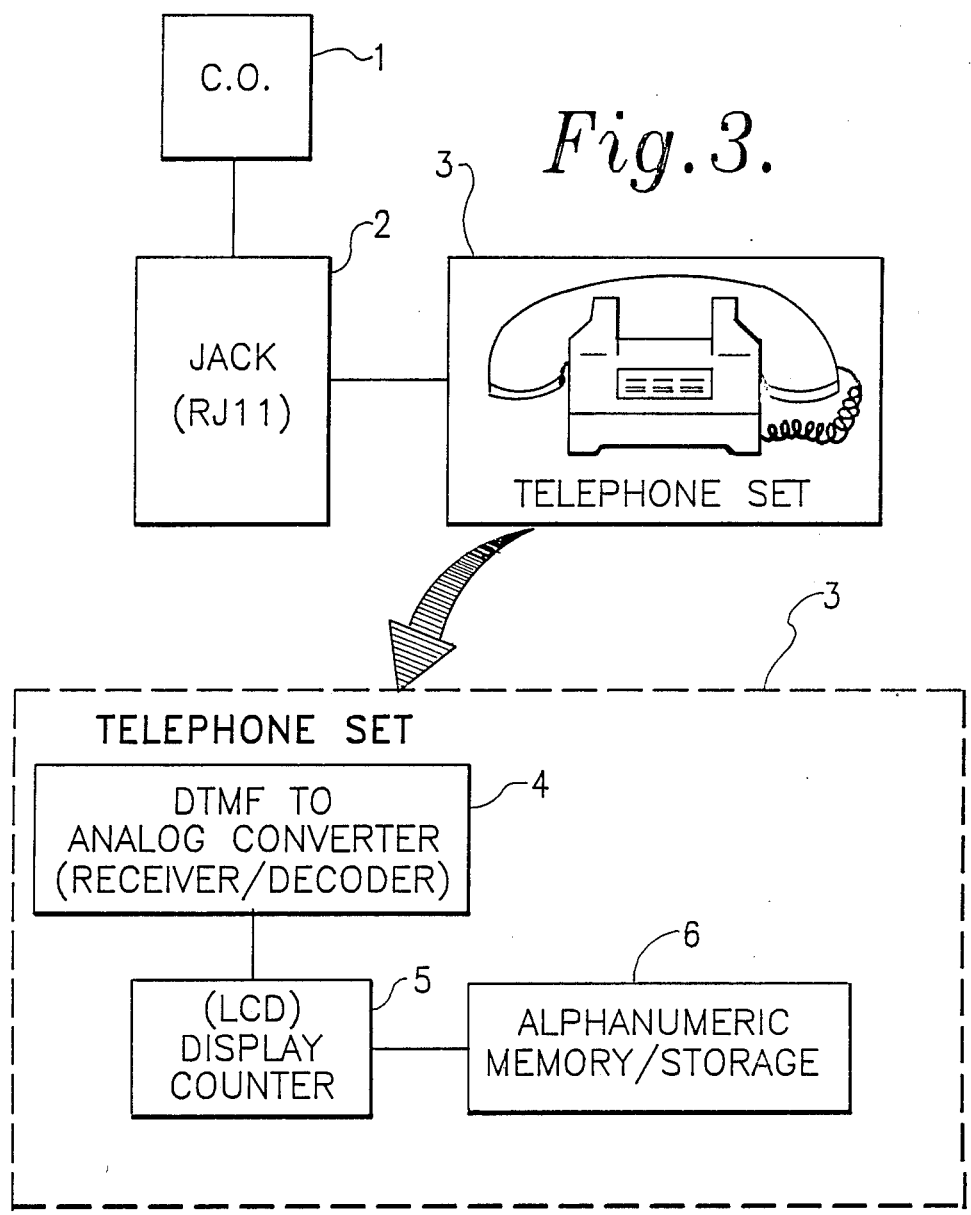

ENHANCED CALLING NUMBER DELIVERY SERVICE SYSTEM

BACKGROUND OF THE INVENTION

1. Field of the Invention

This invention relates to a telephone system and process for transmitting a caller's directory telephone number or a keyed-in telephone number or name over a called customer busy, idle or in-use telephone line and received to an improved apparatus for later recall and or redialing.

2. Description of the Prior Art

When a customer subscribes for conventional single line (hereinafter sometimes referred to as CSL) service and is engaged in and existing ongoing telephone conversation with a first caller and a second caller calls, the second caller receives a conventional busy tone signal while the customer receives no indication of the second caller attempted call or its identity.

When a customer subscribes for call-waiting (CW) service and is engaged in an existing ongoing telephone conversation with a first caller and a second caller calls, the second caller receives audible ringing while the called customer receives CW tone signals. If the called customer acknowledges the CW tone signals by answering the second caller, the called customer will press the on-off switch hook on the telephone set which places the first caller on hold while the called customer is connected to the second caller. If the called customer does not acknowledge the CW tone signals, the second caller continues to receive audible ringing until forced to discontinue the call. Although CW service allows the subscribing customer to answer or ignore incoming calls to its in-use line, CW does not however offer the called customer an alternative way to receive incoming calls to its in-use line when it is not appropriate or possible to interrupt an existing ongoing telephone conversation, and yet not miss other equally important and expecting telephone calls. In addition, since the receipt of audible ringing to the incoming caller is generally understood to be inconsistent with the called customer line being busy, the incoming caller is led to believe that the called customer line is unattended.

A prior customer service feature referred to herein as calling number delivery, technical reference No. TR-TSY-000031, defines Bell Communications Research, Inc. (Bellcore's) view of generic requirements for the calling number delivery feature for residential and small business customers. This service feature allows the called customer terminal premises equipment to receive a first caller directory telephone number (DN) to an IDLE line during the ring cycle, which gives the called customer an opportunity to decide whether to answer the incoming caller. This service feature does not offer any benefits to the customer whose line is busy (i.e. without CW) or in-use) i.e. with CW).

The invention disclosed in the Sergio M. Brecher U.S. Pat. No. 4,661,975, issued Apr. 28, 1987, discloses a process for controlling a telephone switching system which gives a telephone customer alternative ways of handling an incoming call while that customer is engaged with another call. This invention teaches that the conventional call-waiting process is modified by permitting the customer touch-tone telephone set buttons to be operated by the customer for a short interval after the call-waiting signal is given to the customer responsive to the particular tone signals received. When the digits are keyed, the switching system is enabled to send a busy or a prerecorded announcement to the calling party or to reroute the calling party to an alternate destination. This system and service feature does make an attempt to answer incoming calls to an in-use line, but does not offer any alternatives to the customer who does not subscribe for call-waiting service and whose line is busy, or a way to continue an existing ongoing conversation without having to interrupt that conversation to answer the incoming caller.

Thus, it is an object of this invention to provide the called customer with an enhanced service which allows an incoming caller directory telephone number or keyed-in telephone number or name to be received to the called customer premises equipment via the called customer busy, idle or in-use telephone line while the called customer may or may not be engaged in an existing ongoing telephone conversation with another caller.

It is another object of this invention to provide the called customer with premises equipment which receives an incoming caller DTMF transmitted telephone number of name to the premises equipment for later recall and or redialing.

It is yet another object of this invention to provide the called customer with a reverse-call-forwarding service feature which allows an incoming caller to key-in on its touchtone telephone any telephone number or name of choice to which the called customer can return the call.

It is a further object of this invention to provide the Regional Bell Operating Companies and Cellular Mobile Telephone Companies and others with a revenue producing enhanced customer service system which interacts with existing and conventional telephone systems and features without the addition of new hardware at central office or at the mobile telephone switching office.

SUMMARY OF THE INVENTION

In accordance with the teaching of this invention I provide the customer with an enhanced Calling Number Delivery Service (hereinafter sometimes referred to as CNDS) feature which interacts with existing conventional telephone systems and services with or without the call-waiting (hereinafter sometimes referred to as CW) service feature and other customer subscribed to service features, both existing and planned, which allows the CNDS customer to receive to its premises equipment (telepone set or other receiving equipment which has a built-in or connected DTMF receiver/decoder device connected to an alphanumeric memory chip and LCD display counter) an incoming caller telephone number or name via the CNDS customer busy, idle or in-use line while the CNDS customer is engaged in an existing ongoing telephone conversation with another caller.

A first operation of this invention is when an incoming caller reaches a CNDS customer in-use line (i.e. CNDS customer engaged in an existing telephone conversation) which has CW, the CNDS customer receives conventional CW audible tone signals (normally two) while the incoming caller receives conventional audible ringing. If the CNDS customer answers the incoming caller prior to the elapse of the two CW tone signals, CW prevails by connecting the CNDS customer to the incoming caller while the first caller is placed on hold.

If the CNDS customer does not answer the incoming caller prior to the expiration of the preselected two CW tone signals, audible ringing is cancelled to the incoming caller and a prerecorded announcement is connected instead while the CNDS customer and the first caller continue their existing and ongoing conversation. In order not to violate the incoming caller rights by automatically transmitting its telephone number to the CNDS customer premises equipment, the prerecorded message gives the incoming caller an option and opportunity to decide whether to leave its directory telephone number (DN) at the CNDS customer premises equipment by pressing the #code key on the telephone, or to key-in a different telephone number or name by pressing the * code key plus a telephone number or name, or terminate the call by simply hanging up. If the incoming caller decides to key-in a different telephone number or name, central office multifrequency (MF) receiver receives to memory the keyed digits while the MF sender device connects to the CNDS customer in-use voice channel. The MF sender then transmits the keyed digits, now in DTMF form, from the MF receiver memory to the CNDS customer premises equipment, to be stored to memory for later recall and or redialing. If the incoming caller decides to leave its DN by pressing the #code key, the originating central office Stored Program Controlled System (SPCS) memory to which the incoming caller is connected automatically transmits the DN digitally to the terminating central office SPCS memory to which the CNDS customer is connected, and converts the DN from digital signal form to analog signal form to DTMF signal form. The processing continues with the central office MF sender which connecting to the CNDS customer in-use voice channel which then transmits the DTMF digit DN from the terminating SPCS memory to the CNDS customer premises equipment via the CNDS customer in-use telephone line.

A second operation of this invention is when an incoming caller is detected to a CNDS customer busy line without the CW service feature. A prerecorded announcement located at central office is immediately connected to the incoming caller while the CNDS customer receives no notification of the incoming call. Other than the immediatacy of connecting the prerecorded announcement to the incoming caller, the remaining processing of this second operation of this invention is the same as previously described for the first operation of this invention.

A third operation of this invention is when an incoming caller is detected to a CNDS customer idle line with or without CW. Conventional audible ringing is afforded to both the incoming caller and the CNDS customer while a preselected number of rings are counted at the CNDS customer line. Conventional telephone service process prevails if the CNDS customer answers the incoming caller prior to the expiration of the preselected number of rings by connecting the incoming caller to the CNDS customer for a conversation. If the CNDS customer does not answer the incoming caller prior to the expiration of the preselected rings, the audible ringing is cancelled to both the incoming caller and the CNDS customer while a prerecorded announcement is connected to the incoming caller. The prerecorded announcement and the remaining processing of this third operation of this invention is the same as previously described for the first operation of this invention.

BRIEF DESCRIPTION OF THE DRAWINGS

The foregoing objectives of my invention will become more apparent from the following description when read together with the drawing, in which:

FIG. 3 is a block diagram of the called customer premises equipment (telephone set with a built-in or connected DTMF receiver-decoder chip connected to an alphanumeric memory chip and LCD or LED display counter, connected via a RJ11 jack and telephone lines to central office equipment).

DESCRIPTION OF THE PREFERRED EMBODIMENT(S)

Figure 1:
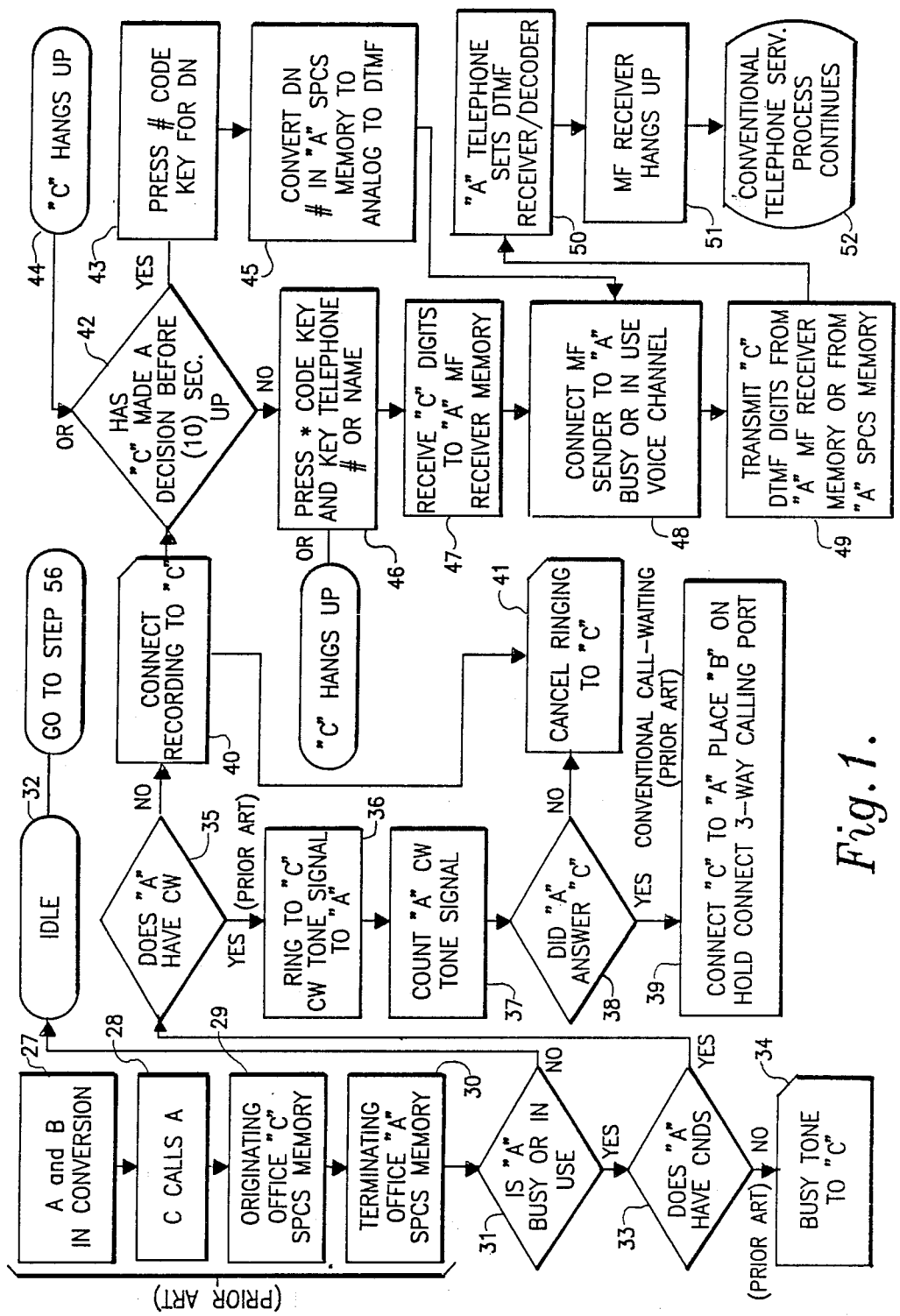
FIG. 1 is a flow chart of the process which allows the called customer premises equipment to receive an incoming caller directory telephone number (DN) or a keyed-in telephone number or name via the called customer busy or in-use telephone line.

Referring now to FIG. 1, the process begins at step 27 with called customer at station A in conversation with a first caller at station B. At step 28, an incoming caller at station C initiates a call to station A. When the incoming caller at station C keys-in or dials station A telephone number, station C directory telephone number (DN) is received to the step 29 originating central office Stored Program Controlled System (SPCS) memory to which station C is connected and is transmitted digitally to the step 30 terminating central office SPCS memory to which station A is connected. Prior Art, Common Channel Signaling (CCS) is used to transmit staton C DN from the step 29 originating SPCS memory to the step 30 terminating SPCS memory. The protocol used by this feature should be Signaling System 7 (SS7), as specified in TR-NPL-000246, Bell Communications Research Specification of SS7. This feature should also be capable of functioning on an intraoffice basis of the terminating office is not served by a CCS network. Step 29 originating office SPCS memory if equipped with SS7 should include station C DN in the address information field within station C address parameter of the Initial Address Message (IAM) for all Bell Telephone Operating Companies (BTOC) and intraLATA interoffice calls placed over trunks served by SS7. The step 30 terminating office should expect to find station C address in the IAM if the intraLATA call setup does not involve an interexchange carrier and is served entirely by SS7. Transmission requirements are given in Bell Communication's Prior Art TR-TSY-000030. In continuance, step 31 as assumption is made that station A is busy. Thus far, all of the processing has been handled in a Prior Art, conventional manner by the step 29 originating office SPCS and call logic of the switching system (not shown) and the step 30 terminating office SPCS. However, if step 29 originating office do not have the SS7 feature, then end-to-end signaling occurs, i.e. step 46 is executed and station C keyed-in telephone number or name is step 47 received to station A MF receiver memory. Switching systems such as the 1AESS for an analog system or the central control for a digital switching system such as the DMS-100 or the 5ESS or other systems (not shown) can be used in processing my inventive system.

In accordance with my invention, an additional decision processing is undertaken beginning at step 33 to determine whether station A subscribes for Calling Number Delivery Service (CNDS) and to step 35 Call-Waiting (CW). If station A do not subscribe for either CNDS or CW, step 34 prior art, conventional busy tones are received to station C. If station A does subscribe for CNDS but not to CW, step 40 a prerecorded announcement is immediately connected to station C. It should be appreciated that the step 40 prerecorded announcement notifies station C with a message, "you have reached a busy line, if you wish to leave your telephone number or name, please do so now". Process at step 42 allows station C ten seconds to make a decision to either step 43 leave its DN by pressing the #code key on the touchtone telephone set or step 46 to leave another telephone number or name by pressing the * code key followed by any telephone number or name up to sixteen (16) digits or step 44 terminate the call by hanging up. If step 43 is executed, step 45 station C digital DN at step 30 terminating office SPCS memory is converted from digital to analog to dual tone multifrequency (DTMF) signal form. If step 46 is executed, step 47 station C keyed digits are received to station A MF receiver memory. If either step 45 or step 47 is processed, step 48 MF sender device at station A office connects to called customer at station A busy, if applicable or in-use, if applicable or idle, if applicable, voice channel for transmission. Step 49 process transmits station C stored DTMF digits from either station a MF receiver memory, if applicable, or step 45 from station A SPCS memory, if applicable, over station A busy or in-use or idle telephone line to the called customer premises equipment (DTMF receiver/decoder connected to an alphanumeric memory and LCD display counter and connected to or built-in to a telephone set). After station C DTMF telephone or name is received to step 50 called customer premises equipment, step 51 the equipment's MF receiver hangs up and step 52 conventional telephone process continues.

Referring now back to step 31, incoming assuming that caller at station C has reached an step 31 in-use line at station A step 28, and station A subscribes for CNDS and CW, step 36 prior art, conventional CW process is activated which enables ringing to station C while station A receives CW tone signals. Process at step 37 counts the preselected number of CW tone signals received to station A (normally two). If station A answers station C prior to the expiration of the two CW tone signals, CW prevails with station A connecting to station C for a conversation while station B is placed on hold. If station A do not answer station C prior to expiration of CW tone signals, step 41 process cancels ringing to station C and step 40 a prerecorded announcement is connected to station C while step 27 station A and station B continue in an existing ongoing conversation. The remaining processing of steps 42 through 52 are the same as previously described above for a busy line.

Figure 2:
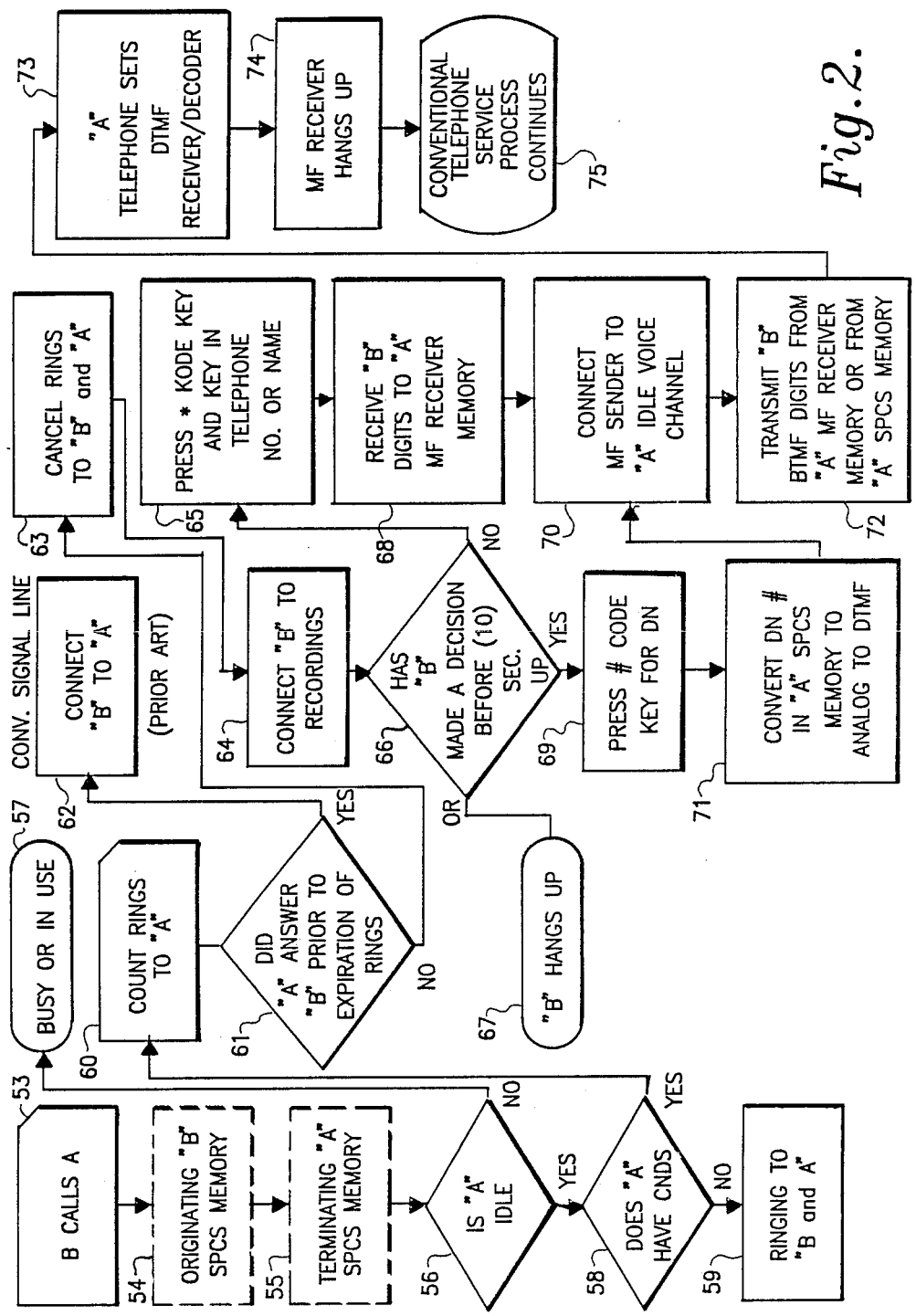
FIG. 2 is a flow chart of the process which allows the called customer premises equipment to receive an incoming caller DN or a keyed-in telephone number or name via the called customer idle telephone line.

Referring now to FIG. 2, the process begins at step 53 with incoming caller at station B initiating a call to called customer at station A. Assuming that step 54 originating office is equipped with the SS7 feature, step 55 terminating office SPCS receives station B digital DN to memory until requested by step 72 MF sender device for transmission to step 73 station A premises equipment. If step 54 originating office to not have SS7 capability, station B step 65 keys-in on a touchtone telephone set any telephone number of choice or name up to sixteen (16) digits which are then step 68 received to station A MF receiver memory until requested by step 70 MF sender device for step 72 transmission to step 73 station A premises equipment.

In accordance with my invention, additional step-by-step decision processing is undertaken beginning at step 56 to determine whether station A is busy, in-use or idle. Assuming that station A is idle, additional decision processing is also undertaken at step 58 to determine whether station A subscribes for CNDS. If station A does not subscribe for CNDS, step 59 prior art, conventional telephone service ringing is received to both station B and to station A. If station A does subscribe for CNDS, step 60 a preselected number of rings are counted at station A line prior to the next decision processing at step 61. If station A answers station B prior to expiration of preselected rings at station A (approx. 3-rings), step 62 prior art, conventional telephone service process connects station B to station A for a conversation. If station A do not answer station B prior to the expiration of (3) rings, step 63 process cancels ringing to station B and to station A and connects step 64 a prerecorded announcement to station B. The remaining processing steps 65, 66, 67, 68, 69, 70, 71, 72, 73, 74 and 75 are the same as previously described in FIG.1, processing steps 42, 43, 44, 45, 46, 47, 48, 49, 50, 51 and 52.

Referring now to FIG.3, is shown a simple block diagram configuration of the preferred embodiment(s) of the called customer premises equipment (telephone set 3 with a built-in or connected DTMF receiver-decoder connected to an alphanumeric memory chip and LCD display counter 4, 5, and 6 as shown, connected via a RJ11 jack 2 and telephone lines to central office equipment 1 in a conventional manner.

A DTMF receiver-decoder chip such as the silicon "SSI-204" connected to a conventional alphanumeric memory chip used in cellular telephones can be used to receive and store to memory the transmitted DTMF telephone number or name.

What is claimed is:

1. A method of controlling central office equipment which allows an incoming caller directory or keyed-in telephone number or name, or a faxed document to be transmitted in DTMF signals form over a called customer busy, idle or in-use line while said called customer may or may not be engaged in an existing ongoing telephone conversation with another caller, and an apparatus for receiving said transmitted DTMF signals and converting said DTMF signals to analog signals to be stored to memory for later recall, display, redialing or printing, comprising the steps of:

(a) detecting, determining whether said called customer telephone line is busy, idle or in-use;
 (b) verifying said called customer subscription to calling number delivery service;
 (c) verifying said called customer subscription to call-waiting;
 (d) counting a preselected number of said call-waiting tone signals on said called customer said in-use line;
 (e) counting a preselected number of rings on said called customer said idle line;
 (f) cancelling said rings to said incoming caller after said preselected number of said call-waiting tone signals on said called customer said in-use line have expired;
 (g) cancelling said rings to said called customer and to said incoming caller after said preselected number of said rings on said called customer said idle line have expired;
(h) enabling, connecting a prerecorded announcement to said incoming caller immediately after said detecting a busy condition on said called customer said busy line;
(i) enabling, connecting said prerecorded announcement to said incoming caller immediately after said cancelling of said rings to said incoming caller;
(j) responding to said prerecorded announcement by permitting said incoming caller or operator to either press the * code key plus any keyed-in telephone number or name on the touchtone telephone which receives keyed digits to central office multifrequency receiver memory, or permit said incoming caller to press the #code key on said touchtone telephone which automatically transmits said telephone number of said incoming caller from the originating office stored program controlled system memory to which said incoming caller is connected, to the terminating office stored program controlled system memory to which said called customer is connected, or permit said incoming caller to terminate the call by hanging up;
(k) converting said directory telephone number in said terminating office said stored program controlled system memory from digital signals to analog signals to DTMF signals;
(l) enabling and connecting central office multifrequency sender switch to said called customer said busy, idle or in-use voice channel and transmit either said keyed digits from said multifrequency receiver memory or said DTMF signals from said terminating office said stored program controlled system memory to said called customer premises equipment;
(m) receiving, displaying and storing to said premises equipment said keyed digits or said DTMF signals which are converted to analog signals for later recall and or redialing; and
(n) terminating said calling number delivery service process after receipt of said keyed digits or said DTMF signals to said premises equipment.

2. Apparatus as recited in claim 1, wherein said receiving, displaying and storing to said premises equipment said keyed digits or said DTMF signals includes:
(a) a telephone set or other receiving equipment connected via a RJ11 jack and telephone lines to central office equipment;
(b) a DTMF receiver-decoder chip built-in or connected to said telephone set which converts said keyed digits and said DTMF signals to analog signals;
(c) an alphanumeric memory chip built-in or connected to said telephone set and to said DTMF receiver-decoder chip for storing said analog signals for later recall and or redialing; and
(d) a LCD or LED display counter built-in or connected to said telephone set or other receiving equipment and to said DTMF receiver-decoder chip and to said alphanumeric memory chip which allows called customer to screen incoming telephone numbers or names of callers while engaged in an existing ongoing conversation with another caller, and to recall from said alphanumeric memory received telephone numbers or names for visual display and or redialing.

* * * * *